US009578954B2

(12) United States Patent
Sellars

(10) Patent No.: US 9,578,954 B2
(45) Date of Patent: Feb. 28, 2017

(54) DETACHABLE SUPPORT FOR A BEVERAGE CONTAINER

(71) Applicant: Jonathan Sellars, Smyrna, GA (US)

(72) Inventor: Jonathan Sellars, Smyrna, GA (US)

( * ) Notice: Subject to any disclaimer, the term of this patent is extended or adjusted under 35 U.S.C. 154(b) by 0 days.

(21) Appl. No.: 15/004,908

(22) Filed: Jan. 23, 2016

(65) Prior Publication Data

US 2016/0213137 A1    Jul. 28, 2016

Related U.S. Application Data

(60) Provisional application No. 62/107,360, filed on Jan. 24, 2015.

(51) Int. Cl.
| A47K 1/08 | (2006.01) |
|---|---|
| A45F 5/02 | (2006.01) |
| B65D 23/00 | (2006.01) |
| B65D 81/38 | (2006.01) |
| F16B 2/24 | (2006.01) |
| F16B 1/00 | (2006.01) |

(52) U.S. Cl.
CPC .............. *A45F 5/02* (2013.01); *B65D 23/003* (2013.01); *B65D 81/3876* (2013.01); *B65D 2313/04* (2013.01); *F16B 2/245* (2013.01); *F16B 2001/0035* (2013.01)

(58) Field of Classification Search
CPC .... A47G 23/0225; A45F 5/02; F16M 13/022; F16B 2/245; F16B 2001/0035
USPC .............. 248/311.2, 206.5, 309.4, 313, 683; 220/737, 324, 230
See application file for complete search history.

(56) References Cited

U.S. PATENT DOCUMENTS

| D239,147 S | * | 3/1976 | Karlsen ........................ D11/215 |
|---|---|---|---|
| 5,044,049 A | | 9/1991 | Owens et al. |
| 5,697,131 A | | 12/1997 | Hunt et al. |
| 7,021,594 B2 | | 4/2006 | Exler |
| D533,751 S | | 12/2006 | Exler |
| D547,618 S | | 7/2007 | Exler |
| 2004/0104320 A1 | * | 6/2004 | Exler ................. A47G 23/0225 248/206.5 |
| 2004/0173719 A1 | * | 9/2004 | Mitchell ............ A47G 23/0225 248/311.2 |
| 2007/0114351 A1 | | 5/2007 | Mitchell |
| 2011/0248060 A1 | * | 10/2011 | Luk ......................... B60R 11/02 224/567 |

* cited by examiner

*Primary Examiner* — Todd M Epps
(74) *Attorney, Agent, or Firm* — Culhane Meadows PLLC; J. Scott Anderson

(57) ABSTRACT

Systems for supporting a container are presented. A support system in one embodiment, includes a metal clip, an insulating sleeve surrounding a beverage container, and at least one magnet that is attached to the sleeve and drawn by an attractive force to the clip, such that the sleeve together with the container is selectively detachable from the clip. Another embodiment includes a metal insert positioned in a belt or garment, instead of the metal clip. Yet another embodiment includes a pair of dipole magnets, with one positioned on the sleeve and its mate positioned on a clip or embedded in a belt or garment.

8 Claims, 2 Drawing Sheets

DETACHABLE SUPPORT FOR A BEVERAGE CONTAINER

CROSS-REFERENCE TO RELATED APPLICATIONS

This application claims the benefit of U.S. Provisional Application 62/107,360, entitled "Boozie," filed Jan. 24, 2015, which is incorporated herein by reference in its entirety.

BACKGROUND

Certain disclosed embodiments relate to the field of container supports and, more particularly, to a system for supporting a container that includes a belt or belt clip and a magnet attached to an insulated sleeve.

An insulated sleeve for a beverage container, sometimes referred to using the Koozie trademark, includes a generally cylindrical portion that is sized and shaped to closely surround a typical beverage can or bottle and may include a bottom or base portion. The insulated sleeve helps maintain the temperature of the beverage and may provide a comfortable gripping surface for the user.

Many cup holders include a hook, clamp, or clip assembly for temporarily securing the cup holder to a surface, such as a table edge, a tray, or a vehicle door. Some existing sleeve designs include a magnet for attaching the sleeve to a metal surface.

For many existing designs, detaching the insulated sleeve involves too many steps and/or requires complete removal of the cup holder or clip, followed by additional effort to re-attach the support. Also, many existing designs offer only partial insulation or include too many parts to be practical.

Thus, there is a need in the art for an improved system for supporting a beverage container.

SUMMARY

A system for supporting a container is described. According to particular embodiments, the system includes a metal clip, a sleeve, and at least one magnet. The metal clip may be made of a continuous length of metal and includes a body portion and a lever portion. Each of the portions is biased toward the other by an arcuate spring portion therebetween. A lip may be formed near a distal end of the lever portion and angled away from the body portion.

The sleeve may be made of insulating material and may include a flexible cylindrical body portion having a lower edge, and a bottom surface attached to the cylindrical body portion along the lower edge.

At least one magnet may be attached to the cylindrical body portion and has a magnetic force sufficient to support a beverage container positioned within the sleeve when the magnet contacts the metal clip, such that the sleeve together with the container is selectively detachable from the metal clip.

The system may further include a covering that is sized and shaped to cover and support the at least one magnet against the cylindrical body portion.

The system may further include indicia applied to the cylindrical body portion of the sleeve.

The magnet may include one or more neodymium-iron-boron magnets, together having a magnetic strength between about thirty kilogauss to about forty kilogauss.

The sleeve may be a foldable, single unit made of neoprene. The bottom surface may be attached in at least two places along the lower edge of the cylindrical body portion of the sleeve.

In use, in response to a user forcing an object toward the lip, the lip urges the lever portion away from the body portion.

According to an alternative embodiment, the magnet may be a pair of dipole magnets, wherein a first dipole magnet is attached to the cylindrical body portion and a second dipole magnet is attached to the metal clip.

According to an alternative embodiment, the metal clip may be a metal insert attached to an item of clothing.

Other apparatuses, methods, systems, features, and advantages of the disclosed embodiments will be apparent to one of ordinary skill in the art upon examination of the following figures and detailed description. All such additional apparatuses, methods, systems, features, and advantages are intended to be included within this description and to be included within the scope of the accompanying claims.

BRIEF DESCRIPTION OF THE DRAWING

Features of the various embodiments disclosed will become more apparent in the following detailed description, in which reference is made to the appended drawing, wherein.

Corresponding reference numbers indicate corresponding parts or elements throughout the several views of the drawing.

DETAILED DESCRIPTION

Figure 1:
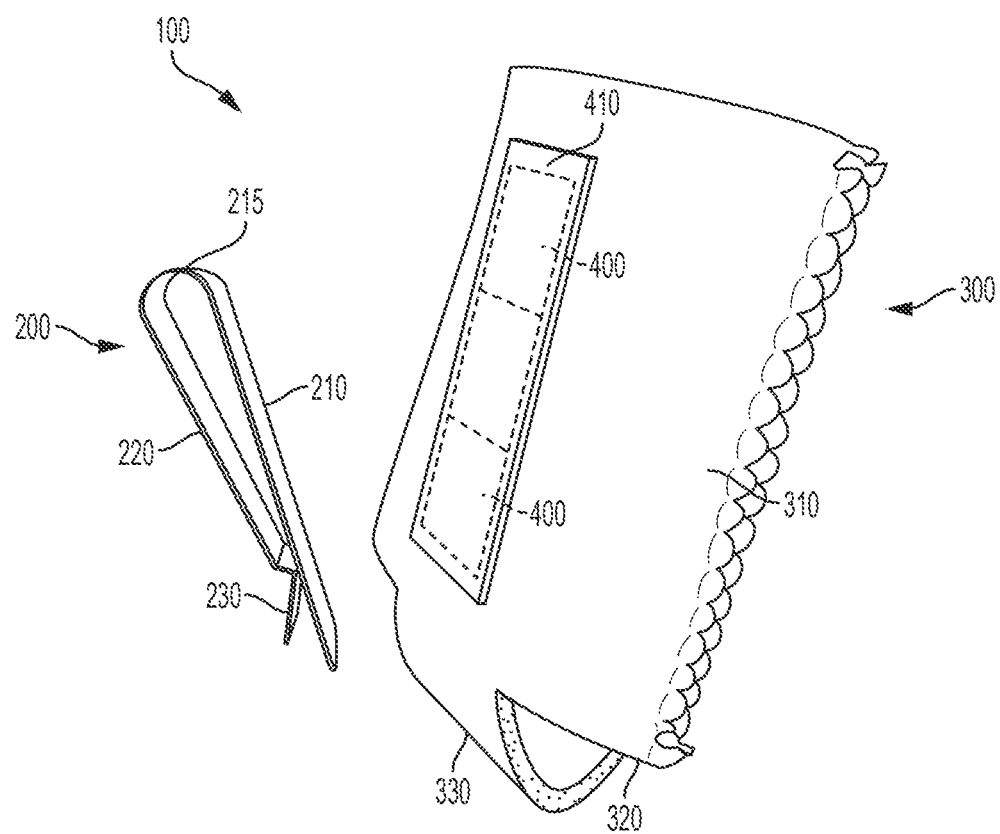
FIG. 1 is a perspective illustration of a clip and a sleeve that includes at least one magnet, according to various embodiments.

The present systems and apparatuses and methods are understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

Like parts are marked throughout the following description and drawings with the same reference numerals. The drawings may not be to scale and certain features may be shown exaggerated in scale or in somewhat schematic format in the interest of clarity, conciseness, and to convey information.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to a component can include two or more such components unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

As used herein, the term "facilitate" means to make easier or less difficult and the term "impede" means to interfere with, hinder, or delay the progress. Also, the words "proximal" and "distal" are used to describe items or portions of items that are situated closer to and away from, respectively, a user or operator. Thus, for example, the near end or other portion of an item may be referred to as the proximal end, whereas the generally opposing portion or far end (or free end) may be referred to as the distal end.

Although the various embodiments are described with reference to supporting a beverage container such as a can or bottle, the assemblies and systems described herein may be used with any of a variety of containers or objects.

Figure 2:
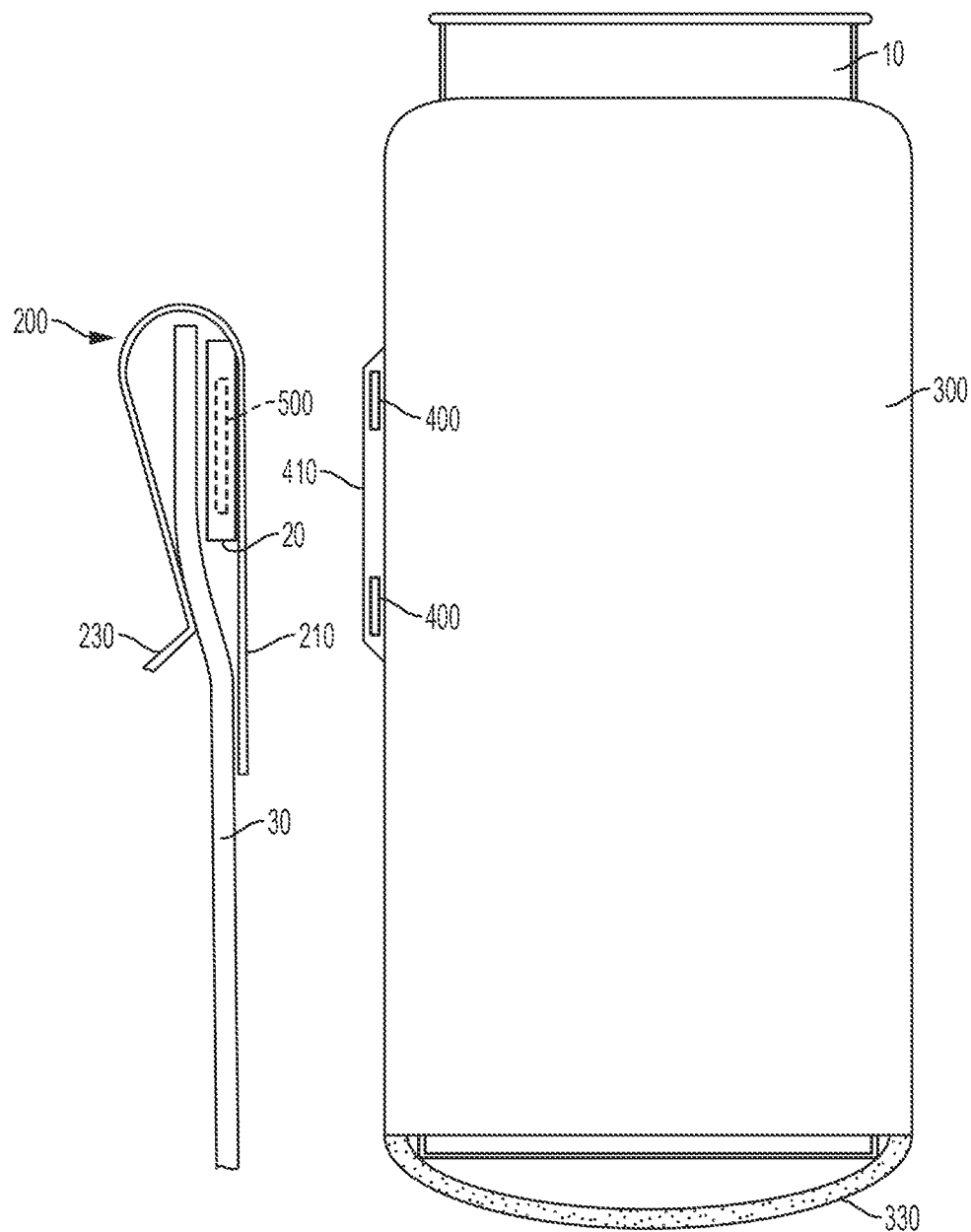
FIG. 2 is a side-view illustration of a clip positioned over a belt and a garment, beside a sleeve that includes at least one magnet, according to various embodiments.

A system 100 for supporting an object, according to various embodiments, includes a clip 200 and a sleeve 300 that includes at least one magnet 400. The object to be supported may be a beverage container 10, such as a can, as illustrated in FIG. 2 and described herein.

The clip 200, as shown in FIG. 1, may be formed from a single, continuous length of metal. The clip 200 may be fabricated by starting with plate metal and stamping or cutting the plate into a particular size and shape. The metal material, according to a presently preferred embodiment, may be a metal or metal alloy that includes iron so that it will attract a magnet. The clip 200 may have a generally uniform width and thickness. For supporting an object such as a beverage container filled with twelve to thirty-two ounces of fluid, the clip 200 may be about one inch wide and one-sixteenth inch thick. For supporting large or heavy objects, the clip 200 may be wider and thicker The clip 200 may be a spring clip, an R-shaped clip, a clip that is shaped like a split pin or cotter pin, or any of a variety of other clips suitable for supporting a particular object.

The clip 200, according to a particular embodiment, may include a body portion 210 and a lever portion 220, as shown in FIG. 1. Each of said portions 210, 220 may be biased toward the other by an arcuate spring portion 215 therebetween. Accordingly, the clip 200 in this embodiment may be referred to as a spring clip.

The clip 200 may include a lip 230 located near a distal end of the lever portion 220. The lip 230 may be angled away from the body portion 210, to form an opening of sorts.

In use, when an object is forced toward the lip 230, the angled orientation of the lip 230 will urge the lever portion 220 away from the body portion 210, thereby opening the clip 200. For example, when the lip 230 is positioned above a belt or upper edge of a garment, and a user forces the clip 200 downward, the lip 230 will urge the lever portion 220 away from the body portion 210, thereby opening the clip 200 and allowing the clip 200 to slide over the belt or garment. As illustrated in FIG. 2, the clip 200 maybe positioned over part of a belt 20 and a garment 30, with the clip 230 positioned inside the garment 30 and the body portion 210 presenting an outwardly facing surface.

The sleeve 300, according to particular embodiments, may be made of insulating material and may include a cylindrical portion 310 having a lower edge 320 and a bottom surface 330 attached along the lower edge 320, as shown in FIG. 1. The material may be flexible plastic, foam, plastic-covered foam, or neoprene. As illustrated in FIG. 1, the cylindrical portion 310 may include one or more seams along which the cylindrical portion 310 may be folded, thereby at least partially collapsing the sleeve 300 when not in use. The bottom surface 330, as shown, may be attached along two generally opposing sides of the lower edge 320.

The cylindrical portion 310 of the sleeve 300 may be shaped and sized in diameter to surround a range of cans or bottles of various sizes. The sleeve 300 is flexible in order to accommodate various container sizes and to facilitate the positioning of the sleeve 300 by sliding onto and off of a container. FIG. 2 illustrates a sleeve 300 surrounding a can-shaped container 10, in which the cylindrical portion 310 supports the side walls of the container 10 and the bottom surface 330 supports the base of the container 10.

The sleeve 300, according to particular embodiments, may include a decoration or indicia that is positioned, for example, on the exterior surface of the cylindrical portion 310 for display. The indicia may include any message or illustration, including for example a brand name, licensed trademark, or logo for a product, businesses, sports team, or other organization.

The magnet 400 may include one or more magnets. According to a particular embodiment, the magnet 400 may include two magnets surrounded by a covering 410, as shown in FIG. 1 and FIG. 2. The magnet 400 may be made of any suitable material, such as a ceramic, a metal or metal alloy capable of being magnetized, or a rare-earth magnet such as a samarium-cobalt magnet or a neodymium-iron-boron (NIB) magnet. NIB magnets are among the strongest and most cost-effective materials for commercial uses such as this, and they are manufactured in a variety of sizes and field strengths. For supporting a filled beverage container, the magnet 400 (or set of one or more magnets) may have a magnetic field strength of about thirty to forty kilogauss. For supporting larger or heavier containers, a magnet 400 may be selected that has a higher field strength.

As illustrated in the embodiment shown in FIG. 1, the two magnets 400 may be block magnets that are square or rectangular in shape with a uniform thickness. Disc magnets, ring magnets, or other shapes, as well as composite assemblies of multiple shapes, may be suitable for particular sleeves and containers. The two magnets 400, as shown in FIG. 1, may be about one-half inch square and 1/32 inch thick. According to particular embodiments, the shape and size of the magnets 400 may be coordinated with the shape and size of the body portion 210 of the clip 200. In this aspect, a clip 200 that is one-half inch wide may be provided with a sleeve 300 that includes a magnet 400 that is one-half inch wide.

The magnet 400 may be attached to the external surface of the cylindrical portion 310 of the sleeve 300 with an adhesive and may be further secured with a protective covering 410. The covering 410, according to particular embodiments, may be a fabric such as cloth or nylon, having a size and shape to cover and secure the magnets 400 to the sleeve 300. The covering 410 may be sewn to the sleeve 300 or attached by an adhesive or other suitable means.

In use, when a sleeve 300 including a magnet 400 is brought near to a metal clip 200, as illustrated in FIG. 2, the magnetic field from the magnet 400 will draw the sleeve 300 toward the clip 200 until contact is made. When the magnet 400 contacts the clip 200, the sleeve 300 and the container 10 it supports will be temporarily attached to the clip 200. For magnets of sufficient strength, the sleeve 300 and container 100 will remain attached to the clip 200 until the user applies a force sufficient to release the sleeve 300 from the clip 200. In this aspect, the sleeve 300 is selectively detachable from the clip 200, thereby providing a quick connect-disconnect functionality for the user.

According to an alternative embodiment, the magnet 400 may include a pair of dipole magnets, with a first dipole magnet oriented north-south and positioned on the sleeve 300 and a second dipole magnet oriented south-north and positioned on the clip 200, arranged such that there is an attractive force between the two magnets.

According to another alternative embodiment, the system 100 includes a sleeve 300 with at least one magnet 400 and, instead of a clip, includes a metal insert 500 embedded within or otherwise attached to a belt 20, as illustrated in FIG. 2. The insert 500 may be made of metal or a metal alloy that includes iron so that it will attract a magnet 400. The insert 500 may be shaped and sized to provide a sufficient surface area and attractive force relative to the magnet 400 that is attached to the sleeve 300. In a related embodiment, an insert (not shown) may be sewn into a garment 30. In either of these embodiments, the magnet 400, instead of being located only on the sleeve 300, may be a pair of dipole magnets as described herein.

According to yet another alternative embodiment, the sleeve may include a metal insert and the magnet 400 may be positioned on the clip 200. The metal insert, in this embodiment, may include one or more curled, spring-biased metal inserts (not shown) positioned around the cylindrical body 310 of the sleeve 300 in an orientation that urges the body 310 radially toward the container 10. In this aspect, the metal inserts provide both a surrounding force to hold the sleeve 300 near the container 10 and an attractive force to hold the sleeve 300 to a magnet 400 positioned on a clip 200. In this embodiment, the sleeve 300 may support the container 10 to such an extent that the sleeve 300 need not include a bottom surface 330. The inserts may be attached to the sleeve 300 by sewing, by adhesive, or by insertion into sleeves that are sized and shaped to receive the inserts. In this embodiment, the magnet 400, instead of being located only on the clip 200, may be a pair of dipole magnets as described herein with one positioned on a metal insert and the matching magnet located on a clip (or on a belt or garment).

Although several embodiments have been described herein, those of ordinary skill in art, with the benefit of the teachings of this disclosure, will understand and comprehend many other embodiments and modifications for this technology. The invention therefore is not limited to the specific embodiments disclosed or discussed herein, and that may other embodiments and modifications are intended to be included within the scope of the appended claims. Moreover, although specific terms are occasionally used herein, as well as in the claims that follow, such terms are used in a generic and descriptive sense only, and should not be construed as limiting the described invention or the claims that follow.

The invention claimed is:

1. A system for supporting a container, comprising:
   a metal clip made of a continuous length of metal comprising a body portion and a lever portion, each of said portions biased toward the other by an arcuate spring portion therebetween, and a lip formed near a distal end of said lever portion and angled away from said body portion;
   a sleeve made of insulating material comprising a flexible cylindrical body portion having a lower edge, and a bottom surface attached to said cylindrical body portion along said lower edge; and
   at least one magnet attached to said cylindrical body portion and having a magnetic force sufficient to support a beverage container positioned within said sleeve when said magnet contacts said metal clip, such that said sleeve together with said container is selectively detachable from said metal clip.

2. The system of claim 1, further comprising a covering sized and shaped to cover and support said at least one magnet against said cylindrical body portion.

3. The system of claim 1, further comprising indicia applied to said cylindrical body portion of said sleeve.

4. The system of claim 1, wherein said at least one magnet comprises two or more neodymium-iron-boron magnets, together having a magnetic strength between thirty kilogauss to forty kilogauss.

5. The system of claim 1, wherein said sleeve comprises a foldable, single unit made of neoprene, and wherein said bottom surface is attached in at least two places along said lower edge.

6. The system of claim 1, wherein, in response to a user forcing an object toward said lip, said lip urges said lever portion away from said body portion.

7. The system of claim 1, wherein said at least one magnet comprises a pair of dipole magnets, wherein a first dipole magnet is attached to said cylindrical body portion and a second dipole magnet is attached to said metal clip.

8. The system of claim 1, wherein said metal clip comprises a metal insert attached to an item of clothing.

* * * * *